United States Patent [19]

Penner et al.

[11] Patent Number: 5,247,602
[45] Date of Patent: Sep. 21, 1993

[54] BLUE TRANSPARENT SECOND HARMONIC GENERATOR

[75] Inventors: Thomas L. Penner, Fairport; Douglas R. Robello, Webster; Nancy J. Armstrong, Ontario; David J. Williams, Fairport; Matthew C. Ezenyilimba, Rochester, all of N.Y.

[73] Assignee: Eastman Kodak Company, Rochester, N.Y.

[21] Appl. No.: 914,163

[22] Filed: Jul. 14, 1992

Related U.S. Application Data

[63] Continuation-in-part of Ser. No. 760,436, Sep. 16, 1991, Pat. No. 5,150,446.

[51] Int. Cl.$^5$ .......................... G02F 1/37; H03F 7/00; B32B 9/04
[52] U.S. Cl. ........................ 385/122; 385/130; 385/131; 385/141; 385/143; 385/145; 359/326; 359/328; 359/332; 428/411.1
[58] Field of Search .............. 385/122, 129, 130, 131, 385/141, 143, 145; 359/326, 327, 328, 329, 330, 331, 332; 428/411.1

[56] References Cited

U.S. PATENT DOCUMENTS

| | | | |
|---|---|---|---|
| 4,431,263 | 2/1984 | Garito | 385/122 X |
| 4,659,177 | 4/1987 | Choe et al. | 385/122 X |
| 4,792,208 | 12/1988 | Ulman et al. | 385/122 X |
| 4,865,406 | 9/1989 | Khanarian et al. | 385/122 X |
| 4,946,235 | 8/1990 | Scozzafava et al. | 385/122 X |
| 4,955,977 | 9/1990 | Dao et al. | 385/122 X |
| 5,002,361 | 3/1991 | DeMartino et al. | 385/122 X |
| 5,029,979 | 7/1991 | Robello et al. | 385/122 X |
| 5,064,265 | 11/1991 | Khanarian et al. | 385/130 |
| 5,076,658 | 12/1991 | Hayden et al. | 385/122 X |
| 5,131,068 | 7/1992 | Khanarian et al. | 385/122 X |
| 5,150,446 | 9/1992 | Penner et al. | 385/122 |
| 5,151,965 | 9/1992 | Rikken et al. | 385/122 |
| 5,155,791 | 10/1992 | Hsiung et al. | 385/122 |
| 5,157,754 | 10/1992 | Bierlein et al. | 385/122 |
| 5,158,823 | 10/1992 | Enomoto et al. | 385/122 X |
| 5,170,460 | 12/1992 | Arvidsson et al. | 385/122 X |

OTHER PUBLICATIONS

D. J. Williams, "Organic Polymeric and Non-Polymeric Materials with Large Optical Nonlinearities", *Angew. Chem.* Int. Ed. Engl. 23 (1984) 690-703.

(List continued on next page.)

*Primary Examiner*—Brian Healy
*Attorney, Agent, or Firm*—Robert Luke Walker

[57] ABSTRACT

An optical article is disclosed comprised of a support including a portion adjacent one major surface which is transparent to the electromagnetic radiation sought to be propagated, an organic layer unit capable of converting a portion of polarized electromagnetic radiation of a selected wavelength to its second harmonic wavelength, means for optically coupling into said organic layer unit polarized electromagnetic radiation of a selected wavelength in its zero order transverse magnetic mode, and means for receiving from the layer unit a portion of the electromagnetic radiation in the form of a first order transverse magnetic mode. The organic layer unit has a thickness which is at least 70 percent of the wavelength of the zero order transverse magnetic mode and differs by less than 100 Å from the thickness required for identical propagation constants of the zero and first order transverse magnetic modes. The organic layer unit is comprised of a Y-type Langmuir-Blodgett assembly of amphiphiles forming a first Langmuir Blodgett layer unit containing noncentrosymmetric organic molecular dipoles of a first orientation providing a second order polarization susceptibility to the first layer unit in excess of $10^{-9}$ electrostatic units, and a Y-type Langmuir-Blodgett assembly of amphiphiles forming a second Langmuir-Blodgett layer unit adapted to be coated on the first Langmuir-Blodgett layer unit containing noncentro-symmetric organic molecular dipoles of a second orientation providing a second order polarization susceptibility to the second layer unit in excess of $10^{-9}$ electrostatic units, but of opposite sign to that of the first layer unit.

14 Claims, 1 Drawing Sheet

OTHER PUBLICATIONS

Zyss, "Nonlinear Organic Materials for Integrated Optics", *Journal of Molecular Electronics*, vol. 1, pp. 25-45, 1985.

Girling, Cade, Kolinsky, and Montgomery, "Observation of Second Harmonic Generation from a Langmuir-Blodgett Monolayer of a Merocyanine Dye", *Electronics Letters*, vol. 21, No. 5, May 28, 1985.

Neal, Petty, Roberts, Ahmad, and Feast, "Second Harmonic Generation from LB Superlattices Containing two Active Components", *Electronics Letters*, vol 22, No. 9, Apr. 24, 1986.

Akhemediev and Novak, Opt. Spectros. (USSR) 58 (4), 558 (1985).

*Electronic and Photonic Applications of Polymers*, M. J. Bowden and S. R. Turner Ed., Chapter 6, Polymers in Nonlinear Optics, by D. Williams, American Chemical Society, 1988.

BLUE TRANSPARENT SECOND HARMONIC GENERATOR

CROSS-REFERENCE TO RELATED APPLICATION

This application is a continuation-in-part of commonly-assigned U.S. patent application Ser. No. 07/760,436 entitled IMPROVED CONVERSION EFFICIENCY SECOND HARMONIC GENERATOR, filed Sep. 16, 1991, by T. L. Penner, D. R. Robello, N. J. Armstrong, and D. J. Williams, now U.S. Pat. No. 5,150,446.

FIELD OF THE INVENTION

The invention is directed to an improvement in optical articles capable of converting polarized electromagnetic radiation of a selected wavelength to a second harmonic wavelength.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by Equation 1:

$$P = \alpha E + \beta E^2 + \gamma E^3 \qquad \ldots (1)$$

where
P is the total induced polarization,
E is the local electric field created by electromagnetic radiation, and
$\alpha$, $\beta$, and $\gamma$ are the first, second, and third order polarizabilities, each of which is a function of molecular properties.
$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)}E + \chi^{(2)}E^2 + \chi^{(3)}E^3 \qquad \ldots (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium.
$\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi^{(1)}E$, second order or first nonlinear polarization $\chi^{(2)}E^2$, and third order or second nonlinear polarization $\chi^{(3)}E^3$.

To achieve on a macromolecular level second order polarization, $\chi^{(2)}E^2$, of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu.

A significant difficulty encountered in finding materials exhibiting usefully large second order polarization effects lies in the molecular requirements that must be satisfied to achieve usefully large values of $\beta$. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies). Materials having usefrully large values of $\beta$ are commonly referred to as molecular dipoles.

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are placed in an electric field.

Second order polarization, $\chi^{(2)}E^2$, has been suggested to be useful for a variety of purposes, including parametric effects, most notably frequency doubling, also referred to as second harmonic generation (SHG). Frequency doubling has attracted particular attention, since laser diodes are not readily constructed that can emit shorter wavelengths, but their outputs when doubled in frequency provide these wavelengths.

For a number of years the materials employed for achieving second order polarization effects were non-centrosymmetric inorganic crystals, such as potassium dihydrogen phosphate and lithium niobate. David J. Williams, "Organic Polymeric and Non-Polymeric Materials with Large Optical Nonlinearities", *Angew. Chem. Int. Ed. Engl.* 23 (1984) 690–703, postulated mathematically and experimentally corroborated second order polarizabilities in organic molecular dipoles equalling and exceeding those of inorganic crystals. Electrical poling and Langmuir-Blodgett construction techniques were recognized from the outset to be feasible approaches for polar alignment of the organic molecular dipoles to translate molecular second order polarizabilities into layer second order polarization susceptibilities. Zyss, "Nonlinear Organic Materials for Integrated Optics", *Journal of Molecular Electronics*, Vol. 1, pp. 25–45, 1985, is essentially cumulative with Williams, surveying applications for organic molecular dipoles to varied nonlinear optical needs.

Garito U.S. Pat. No. 4,431,263; Girling, Cade, Kolinsky, and Montgomery, "Observation of Second Harmonic Generation from a Langmuir-Blodgett Monolayer of a Merocyanine Dye," *Electronics Letters*, Vol. 21, No. 5, Feb. 28, 1985; Neal, Petty, Roberts, Ahmad, and Feast, "Second Harmonic Generation from LB Superlattices Containing two Active Components," *Electronics Letters*, Vol. 22, No. 9, Apr. 24, 1986; and Ulman et al U.S. Pat. No. 4,792,208 provide illustrations of organic molecular dipoles deposited by Langmuir-Blodgett techniques to form layers exhibiting significant $\chi^{(2)}$ values.

Williams and Zyss are extrapolations from limited demonstrated capabilities to theoretically possible applications, including second harmonic generation. Garito, Girling et al, Neal et al, and Ulman are concerned with Langmuir-Blodgett components to meet device requirements.

What has been absent from the art are optical device constructions that go beyond the bare minimum features for corroborating the theoretical feasibility of frequency doubling to structural features necessary for high conversion efficiencies. Akhemediev and Novak, Opt. Spectros. (USSR) 58 (4), 558 (1985) represents a first, albeit theoretical step in the direction of improving conversion efficiencies by mathematically modeling a Langmuir-Blodgett bilayer construction exhibiting $\chi^{(2)}$ values of opposite sign to counteract cancelling positive and negative amplitudes in the second harmonic electric field. There is no indication that Akhemediev et al actually built an optical article or had the capability of actually building the type of device construction mathematically modelled.

*Electronic and Photonic Applications of Polymers*, M. J. Bowden and S. R. Turner Ed., Chapter 6, Polymers in Nonlinear Optics, by D. Williams, American Chemical Society 1988, suggests in FIG. 6.18 a waveguide construction similar to that of Akhemediev et al using X or Z type LB assemblies.

Penner et al U.S. Ser. No. 07/735,551, filed Jul. 25, 1991, now abandoned, and commonly assigned, entitled HIGH SECOND ORDER POLARIZATION SUSCEPTIBILITY AND LOW TRANSMISSION ATTENUATION, discloses an optical article comprised of an organic layer unit exhibiting a second order polarization susceptibility greater than $10^{-9}$ esu and means for providing an optical input to and an optical output from the layer unit. The organic layer unit exhibits a transmission attenuation of less than 2 dB/cm and is comprised of a Y type Langmuir-Blodgett assembly having superimposed oriented monomolecular layers of first and second polymeric amphiphiles each containing repeating units comprised of a hydrophilic moiety and a lipophilic moiety. Repeating units of one or both of the first and second amphiphiles each contain an organic molecular dipole, and repeating units of one or both of the first and second amphiphiles each contains a branched lipophilic moiety of up to 9 carbon atoms.

SUMMARY OF THE INVENTION

In one aspect, this invention is directed to an optical article comprised of a support, an organic layer unit capable of converting a portion of electromagnetic radiation of a selected wavelength to its second harmonic wavelength, means for optically coupling into said organic layer unit a source of polarized electromagnetic radiation having a wavelength representing a zero order magnetic mode, and means for receiving from said organic layer unit a portion of the electromagnetic radiation in the form of a first order transverse magnetic mode, wherein:

the support includes adjacent one major surface a portion which exhibits a transmission attenuation of less than 2 dB/cm forelectromagnetic radiation having a wavelength between 400 and 500 nanometers, the organic layer unit has a thickness which is at least 70 percent of the wavelength of the zero order transverse magnetic mode and differs by less than 100 Å from the thickness required for identical propagation constants of the zero and first order transverse magnetic modes, the organic layer unit is comprised of a Y-type Langmuir-Blodgett assembly of amphiphiles forming a first Langmuir-Blodgett layer unit containing noncentrosymmetric organic molecular dipoles of a first orientation providing a second order polarization susceptibility to the first layer unit in excess of $10^{-9}$ electrostatic units, the organic layer unit is comprised of a Y-type Langmuir-Blodgett assembly of amphiphiles forming a second Langmuir-Blodgett layer unit adapted to be coated on the first Langmuir-Blodgett layer unit containing noncentrosymmetric organic molecular dipoles of a second orientation providing a second order polarization susceptibility to the second layer unit in excess of $10^{-9}$ electrostatic units, but of opposite sign to that of the first layer unit, and the organic layer unit exhibits a transmission attenuation of less than 2 dB/cm forelectromagnetic radiation having a wavelength between 400 and 500 nanometers.

It is an advantageous effect of some of the embodiments of this invention to provide optical articles which are substantially transparent to light having a wavelength between 400 and 500 nanometers and are capable of efficiently converting polarized electromagnetic radiation of a selected wavelength to a second harmonic wavelength.

Figure 1:
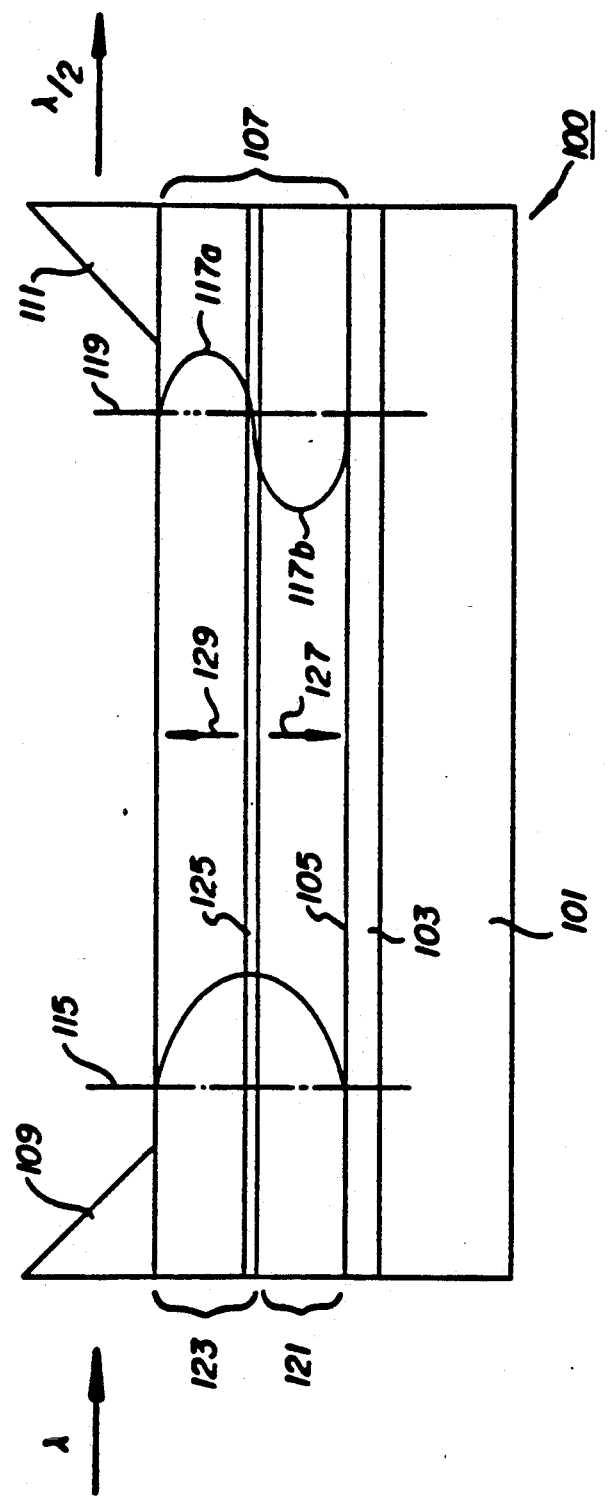
FIG. 1 is a schematic diagram of an optical article requirements of the invention.

Layer thicknesses have been exaggerated for ease of illustration.

DESCRIPTION OF SPECIFIC EMBODIMENTS

In keeping with common usage Langmuir-Blodgett layers are also referred to as L-B layers.

An optical article 100 capable of efficiently converting polarized electromagnetic radiation of a selected wavelength to a second harmonic wavelength is shown in FIG. 1. Polarized electromagnetic radiation of a selected wavelength supplied to the article is schematically indicated by the arrow $\lambda$ while electromagnetic radiation of a second harmonic wavelength emanating from the device is schematically indicated by arrow $\lambda/2$.

The optical article is shown comprised of a support made up of portions 101 and 103. The sole required function of support portion 101 is to offer structural integrity to the device. Any convenient substrate material can be used as this purpose. In a simple device construction the materials satisfying the requirements of support portion 103 also have the capability of lending structural integrity to the device. In this instance support portions 101 and 103 can be different portions of a single unitary element.

Support portion 103 is selected to be optically transparent to both $\lambda$ and $\lambda/2$, thereby avoiding optical attenuation during transmission through the device. In addition support portion 103 is selected for its ability to support a Langmuir-Blodgett film on its major surface 105. Support portion 103 can be selected so that major surface 105 is either hydrophilic or oleophilic.

Formed on the major surface of the support is an organic layer unit 107. A prism 109 is shown as a means for coupling polarized electromagnetic radiation $\lambda$ into the organic layer unit while prism 111 is shown as a means for coupling polarized electromagnetic radiation $\lambda/2$ out of the organic layer unit.

The organic layer unit is capable of acting as a transmission medium for the electromagnetic radiation $\lambda$, concurrently efficiently converting a portion of this electromagnetic radiation to λ/2, and acting as a transmission medium for the electromagnetic radiation λ/2. To accomplish these three functions the organic layer unit must be transparent or near transparent to each of λ and λ/2. This, coupled with the optical transparency of support portion 103, avoids internal attenuation within the device. The surfaces as well as the interior of the organic layer unit must be smooth and essentially defect free to avoid scattering or otherwise disrupting the electromagnetic radiation as it is being transmitted. Additionally, the thickness of the organic layer unit must be at least 70 percent of λ to contain adequately the electric field of λ as it is being guided through the device. Taking these requirements into account, the articles of the invention with organic layer unit thicknesses in the range of from about 1.6 μm to 600 nm particularly lend themselves to use with lasers having outputs in the 1.9 μm to 830 nm wavelength range. In a particular embodiment of the invention disclosed in Examples 11 and 12, the organic layer unit and support exhibit a transmission attenuation of less than 2 dB/cm forelectromagnetic radiation having a wavelength between 400 and 500 nanometers. In that embodiment, articles of the invention with organic layer unit thicknesses in the range of from about 1.2 μm to 600 nm particularly lend themselves to use with lasers having outputs in the 1.0 μm to 800 nm wavelength range.

To be capable of internally producing λ/2, the organic layer unit must exhibit an absolute second order polarization susceptibility, $\chi^{(2)}$, of greater than $10^{-9}$ electrostatic units. This in itself is not, however, sufficient to achieve a high conversion efficiency. If, instead of the specific construction described below, the organic layer unit consisted of one uniform layer having the requisite $\chi^{(2)}$, the device would be operative, but highly inefficient. One reason for this can be appreciated by the manner in which λ and λ/2 are propagated within the organic layer unit. The maximum positive amplitude profile of the electric field of λ is shown at 113, where axis 115 represents zero amplitude. At a second location in the organic layer unit in phase with the amplitude profile 113 the corresponding amplitude profile of the electric field of λ/2 is shown at 117a and 117b, where axis 119 represents zero amplitude. While lobe 117a represents a maximum positive amplitude profile, lobe 117b represents a maximum negative amplitude profile. Thus, the net amplitude of the electric field of λ/2 integrated across the total thickness of the organic layer unit is zero.

This in turn means that the conversion efficiency of the organic layer unit integrated over its entire thickness is also zero, as illustrated by equation 3:

$$v = [\int E_\lambda(z) E_{\lambda/2}(z) \chi^{(2)} dz]^2 \quad (3)$$

where
  $v$ is the conversion efficiency;
  $\chi^{(2)}$ is the second order polarization susceptibility of the organic layer unit;
  $E_\lambda$ is the electric field amplitude
  $E_{\lambda/2}$ is the electric field amplitude of λ/2;
  $\int$ represents an integral sign; and
  $z$ is the thickness of the organic layer unit.

Notice that a real conversion from the λ wavelength to the λ/2 wavelength occurs within the organic layer unit. If electromagnetic radiation output of the organic layer unit is sampled over only a portion of its thickness, a measurable conversion from λ to λ/2 can be observed. However, the magnitude of the conversion efficiency is exponentially lowered in comparison to that which might be realized if noncancelling amplitudes could be obtained over the full thickness of the organic layer unit.

In the present invention the organic layer unit is divided into two separate Langmuir-Blodgett layer units. The first Langmuir-Blodgett layer unit 121 is formed on the major surface 105 of the support. The second Langmuir-Blodgett layer unit 123 is formed on the first L-B unit 121. As shown, the second L-B layer unit includes an interface layer unit 125 to facilitate its formation on the first layer unit. The function of the interface layer unit is to facilitate adhesion of the first-deposited layer of the second L-B layer unit to the last-deposited layer of the first L-B layer unit. Where adhesion is adequate in the absence of the interface layer unit, it can, of course, be omitted.

The purpose of constructing the organic layer unit of two separate L-B layer units is to permit the organic molecular dipoles in the first and second L-B layer units to be oppositely oriented. This is schematically illustrated by the oppositely oriented arrows 127 and 129 in the first and second L-B layer units, respectively. Although the arrows are shown in their ideal perpendicular (90°) orientation to the major surface 105 of the support, it is appreciated that orientations of the molecular dipoles at angles down to about 50° are not uncommon.

By reversing the polarity of the organic molecular dipoles in the second L-B layer unit with respect to those in the first L-B layer unit the sign of the second order polarization susceptibility, $\chi^{(2)}$, in the second L-B layer unit is opposite that of the first L-B layer unit. By resolving the conversion efficiency of equation (3) into two separate integrations (3a) for the first L-B layer unit having a thickness z/2 and (3b) for the second L-B layer unit having a thickness z/2, the following relationships are observed:

$$v = [\int E_\lambda(z/2)(-E)_{\lambda/2}(z/2)(-\chi^{(2)}) dz/2]^2 \quad (3a)$$

$$v = [\int E_\lambda(z/2)(+E)_{\lambda/2}(z/2)(+\chi^{(2)}) dz/2]^2 \quad (3b)$$

By reversing the sign of the $\chi^{(2)}$ in the first L-B layer unit in relation to that in the second L-B layer unit the opposite amplitude polarities are offset to produce conversion efficiencies in each of the L-B layer units that are non-cancelling. Thus constructing the organic layer unit as two separate L-B layer units as described eliminates a fundamental barrier to achieving high conversion efficiencies.

Although the description above has for simplicity been based on each of the two L-B layer units contributing exactly half the thickness of the organic layer unit, it is appreciated that increased conversion efficiencies occur from any apportionment of total organic layer unit thickness between the two L-B layer units. Significant improvements in conversion efficiencies can occur with the thickness of either L-B layer unit ranging up to 90 percent of the total organic layer unit thickness. For some embodiments of the invention, the L-B layer units individually account for from 40 to 60 percent of the total organic layer unit thickness or from 45 to 55 percent of the total organic layer unit thickness. In a particular embodiment of the invention disclosed in Examples 11 and 12, the L-B layer units individually account for from 35 to 65 percent of the total organic layer unit thickness.

While the structural features described above remove barriers to improved conversion efficiencies, additional structural features are required to realize high conversion efficiencies. As electromagnetic radiation λ is propagated within the organic layer unit a portion of it is converted to its second harmonic λ/2. Transmission over one coherence length, a very small distance (typically less than 10 micrometers), converts only a very small portion of λ to λ/2. To achieve a significant conversion of λ to its second harmonic λ/2 further propagation within the organic layer unit is required. Unfortunately, unless the transmission velocities of λ and λ/2 are equal, transmission through a second coherence length within the organic layer unit reconverts a portion of λ/2 back to its original wavelength λ.

The organic layer units of the optical articles of this invention are constructed to allow the propagation rates of λ and λ/2 to be at least approximately matched within the organic layer unit. To explain how this is accomplished, it is necessary to describe the polarized source of electromagnetic radiation λ in somewhat greater detail. In constructing the optical article of this invention it is possible to supply to the organic layer unit the polarized electromagnetic radiation λ in either of two polarization modes, a transverse electric mode (TE) or a transverse magnetic mode (TM). If the electromagnetic radiation λ were supplied to the organic layer unit in the TE mode, as proposed by Akhemediev et al, cited above, the electric field would be oriented parallel to the major surface 105 with the magnetic field perpendicular to the major surface 105. Akhemediev et al proposed conversion from the zero order transverse electric mode, $TE_o$, to the first order transverse magnetic mode, $TM_1$.

Contrary to the teachings of Akhemediev et al, the optical articles of this invention include the structure required to supply polarized electromagnetic radiation λ to the organic layer unit in its zero order transverse magnetic mode $TM_o$. This orients the electric field of λ perpendicular to the major surface 105 and achieves a more efficient interaction with the molecular dipoles of the L-B layer units. The electromagnetic radiation λ/2 is produced by conversion of λ from its $TM_o$ mode to its $TM_1$ mode. This is a more efficient conversion than $TE_o$ to $TM_1$.

It is necessary to make a specific selection of the conversion modes, in this instance $TM_o$ to $TM_1$, to be able to construct the organic layer unit for high conversion efficiency. The rate of transmission of electromagnetic radiation of a given wavelength in a bulk medium is a function of the refractive index of the medium. It is generally recognized that the numerical value of a refractive index for a bulk transmission medium is dependent on the wavelength of the electromagnetic radiation being propagated. Thus, $TM_o$ and $TM_1$ can be expected to propagate at different rates in bulk transmission media. For thin films, such as those contemplated for use in the practice of this invention, observed (i.e., measured) refractive indices are referred to as "effective refractive indices", since they are dependent on the thickness of the film. Since this invention is concerned with matching the propagation rates of $TM_o$ and $TM_1$, the propagation constants of the organic layer units are the parameter of choice for comparison, where the propagation constant is the product of the effective refractive index and wavenumber of the electromagnetic radiation of interest in free space ($\omega/c$, where $\omega$ is the angular frequency of the electromagnetic radiation and c is its speed).

By constructing organic layer units otherwise satisfying the requirements of this invention of varied thicknesses a plot of propagation constants versus thickness for each of $TM_o$ and $TM_1$ can be obtained. This thickness of the organic layer unit that produces identical $TM_o$ and $TM_1$ propagation constants is the ideal thickness for the organic layer unit of the optical article of the invention. In practice the ideal thickness cannot be reproducibly achieved. However, if the thickness of the organic layer unit differs by less than 100 Å from that required for identical propagation constants of the $TM_o$ and $TM_1$ modes, a relatively high conversion efficiency from the $TM_o$ to the $TM_1$ mode can be realized.

From the foregoing discussion it is apparent that constructing an optical article for high efficiency $TM_o$ to $TM_1$ conversion places stringent requirements on the organic layer unit:

(a) The thickness of the organic layer unit must be at least 70 percent of the wavelength of λ, which, for typical applications, is in the range of from 1.6 μm to 600 nm.

(b) The organic layer unit must be substantially transparent to λ, the input electromagnetic radiation.

(c) The organic layer unit must be substantially transparent to λ/2, second harmonic electromagnetic radiation.

(d) The organic layer unit must exhibit an absolute $\chi^{(2)}$ of at least $10^{-9}$ esu.

(d) The organic layer unit must be divided into two component layer units the $\chi^{(2)}$ of which differ in sign. In other words incorporated molecular dipoles in the two component layer units must have oppositely oriented polarities.

(f) The thickness of the organic layer unit must differ by less than 100 Å from that required to provide the same propagation constants of the zero and first order transverse magnetic modes.

Taking all of the above factors into consideration, Langmuir-Blodgett film assemblies have been selected to satisfy the requirements of the optical articles of the invention. Because L-B film assemblies are constructed in mono-molecular layer increments and each monomolecular layer typically ranges from about 10 to 50 Å, it is apparent that this approach is consistent with forming the organic layer unit within ±100 Å of an aim thickness.

The molecules used to construct L-B films are amphiphiles—that is, compounds that contain at least one hydrophilic moiety (Hy), also commonly referred to as a head group, and at least one lipophilic moiety (L), also commonly referred to as a tail group, joined through a linking group (K). The first mono-molecular amphiphile layer deposited on the support surface 105 takes one of two possible orientations, depending upon whether the support surface is hydrophilic or lipophilic:

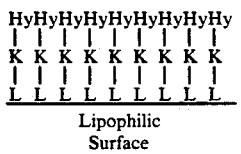

(4a)

Lipophilic Surface

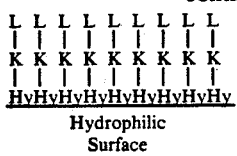
Hydrophilic Surface (4b)

To achieve high second order polarizabilities, $\chi^{(2)} > 10^{-9}$ esu, it is necessary that a high proportion of the amphiphile layers used to construct the L-B assemblies contain a molecular dipole linking group (M). For a linking group to be considered a molecular dipole linking group its second order polarizability, $\beta$, must be greater than $10^{-30}$ electrostatic units (esu). The following reflects the inclusion of a molecular dipole:

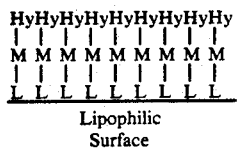
Lipophilic Surface (5a)

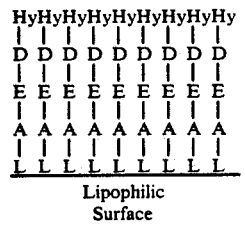
Hydrophilic Surface (5b)

Each molecular dipole in turn is comprised of at least one electron donor (D), at least one electron acceptor (A) and a linking group (E), specifically a conjugated $\pi$ bonding system, which provides a pathway for charge transfer resonance between A and D:

 (6)

Taking into account the orientation of the molecular dipole M in the amphiphile, relationships 5a and 5b can be expanded into four relationships:

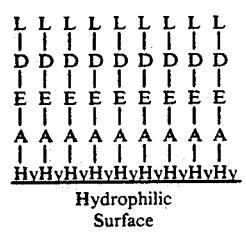
Lipophilic Surface (7a)

Hydrophilic Surface (7b)

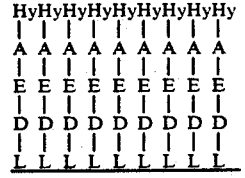
Lipophilic Surface (7c)

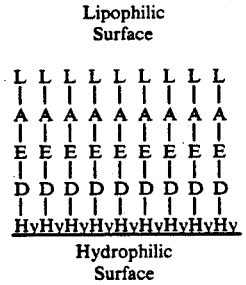
Hydrophilic Surface (7d)

Although the amphiphiles have been shown above as monomeric compounds, it is appreciated that the amphiphiles can be repeating units in a polymer, where the backbone of the polymer serves as the hydrophilic moiety Hy or the lipophilic moiety L. The following reflects polymeric linkage (—) of the amphiphiles:

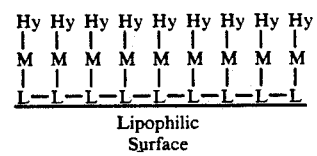
Lipophilic Surface (8a)

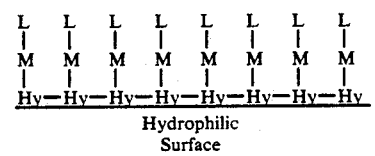
Hydrophilic Surface (8b)

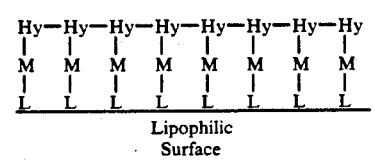
Lipophilic Surface (8c)

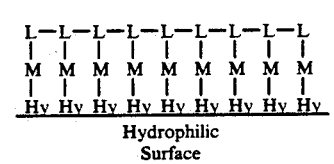
Hydrophilic Surface (8d)

It is also possible to employ as spacer layers polymeric amphiphiles which do not include molecular dipoles. It has been observed that higher levels of stability can be realized when one or more recurring amphiphile layers in an L-B layer unit are constructed using polymeric amphiphiles.

In the foregoing description only a single amphiphile layer is shown on a support. To satisfy the organic layer unit thicknesses required for the optical articles of the invention a large number of superimposed amphiphile monolayers are required. Multilayer L-B assemblies are characterized as X, Y or Z type assemblies, depending on the relative orientations of the amphiphile layers. In a Z type assembly the first amphiphile layer is oriented with the hydrophilic moiety nearest the support as shown at 4b, 5b, 7b, 7d, 8b and 8d above. The next and all subsequent amphiphile layers are deposited in the same orientation as the first amphiphile layer—that is, the hydrophilic moiety Hy is nearer the support than the lipophilic moiety L in each successive layer.

X type assemblies are similar to Z type assemblies, except that the lipophilic moiety L in each amphiphile layer is nearest the support. Thus, X type assemblies are constructed starting with the initial layer arrangements shown at 4a, 5a, 7a, 7c, 8a and 8c above. The next and all subsequent amphiphile layers are deposited in the same orientation as the first amphiphile layer—that is, the lipophilic moiety L is nearer the support than the hydrophilic moiety Hy in each successive layer.

X and Z type assemblies have the appeal of structural simplicity and were the only type L-B assemblies envisioned by D. Williams, cited above, to have any applicability to the construction of nonlinear optical articles of the general type contemplated by this invention, since all successive amphiphile monomolecular layers can be identical within an L-B layer unit.

It is the discovery of this invention that structurally more complex Y type L-B assemblies are not only feasible in the construction of the L-B layer units 121 and 123, but also produce advantages in construction and stability. In Y type L-B assemblies hydrophilic moieties are deposited on hydrophilic moieties and lipophilic moieties are deposited on lipophilic moieties:

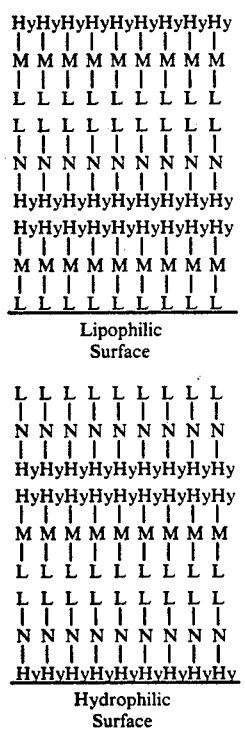

One major advantage of Y type L-B assemblies is that they place the lipophilic moieties and hydrophilic moieties in adjacent positions in the layer sequence and thereby provide a more stable L-B assembly.

However, Y type L-B assemblies require at least two different types of amphiphiles. In one embodiment, two different amphiphiles, L-M-H and L-N-H, are required, where N represents a molecular dipole having its polarity reversed as compared with the molecular dipole M. In other words, if the molecular dipole M is oriented with its electron donor group adjacent the lipophilic moiety L, the molecular dipole N is oriented with its electron acceptor group adjacent the lipophilic moiety L, so that L-M-Hy is by expanded notation L-D-E-A-Hy while L-N-Hy is by expanded notation L-A-E-D-Hy. If the same amphiphile were employed in each successive layer, a centrosymmetric structure would result in which the contribution of the molecular dipoles in each amphiphile layer to $\chi^{(2)}$ would be cancelled by the oppositely oriented molecular dipoles in the next adjacent layer.

An alternate Y type assembly, one that permits the use of only a single type of molecular dipole containing amphiphile, can be achieved by replacing every other amphiphile monomolecular layer with a amphiphile monomolecular spacer layer lacking a molecular dipole. The spacer amphiphiles can be identical to the amphiphiles containing molecular dipoles, except that the molecular dipole M or N is replaced by linking group (S) which exhibits a second order polarizability of less than $10^{-30}$ esu. In this arrangement the following layer sequences can be employed:

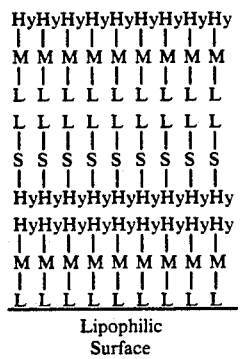

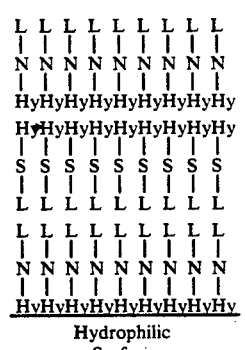

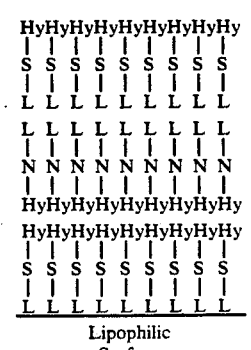

(10d)

Hydrophilic Surface

In 9a and 9b each of the amphiphiles L-M-Hy and L-N-Hy must be capable of depositing on the other. This involves preparing an amphiphile that, in addition to exhibiting the high second order polarizability $\beta$ desired, also performs well as an L-B amphiphile in forming successive monomolecular layers. It is apparent that this requires amphiphile selection to be based on an acceptable balance of the ability of the amphiphile to perform two entirely different functions. It has been observed that amphiphiles having high $\beta$ values can perform entirely satisfactorily as deposition surfaces for other amphiphiles or when deposited on other amphiphiles, but lack the adherency required for deposition on themselves or similar amphiphiles. By having freedom to select the amphiphiles L-S-Hy in 10a-d lacking high $\beta$ values from a wide range of known amphiphiles strictly on the basis of their desirability in terms of L-B layer construction capabilities, the advantage can be realized of achieving higher deposition efficiencies and hence more uniform and stable L-B assemblies. Since spacer moiety S of the L-S-Hy amphiphiles can be relatively small in relation to the molecular dipoles M and N in the L-M-Hy and L-N-Hy amphiphiles, any reduction in the value of $\chi^{(2)}$ attributable to the presence of spacer amphiphiles can be kept to a relatively low level.

In the foregoing discussion three successive amphiphile monolayer repeating units have been shown, which is the minimum number required to show the layer sequence. In practice many more successive layers are required to complete each of the L-B layer units.

Once deposition of the first L-B layer unit 121 has been completed it is necessary to construct the second L-B layer unit 123 with the sign of its second order polarization susceptibility, $\chi^{(2)}$, reversed. This is accomplished by reversing the polar orientation of the molecular dipoles M and N in the amphiphiles of the second L-B layer unit as compared to the first L-B layer unit.

In X and Z type L-B assemblies reversing the polarities of the organic molecular dipoles in second L-B layer unit 123 with respect to the first is accomplished by changing the orientation of the molecular dipole with respect to the head and tail groups. For example, if the first L-B layer unit is constructed of Hy-A-E-D-L layers, the second L-B layer unit can be formed merely by substituting Hy-D-E-A-L layers.

In constructing Y type L-B assemblies it is possible to reverse the orientation of the organic molecular dipoles forming the second L-B layer unit with respect to the first L-B layer unit without introducing any additional amphiphile. This is achieved merely by depositing one of the amphiphiles on itself. Since the Hy-S-L amphiphiles can be selected on the basis of their ability for self-adhesion, it is desirable to reverse organic molecular dipole orientation between the first and second L-B layer units by coating a spacer amphiphile on itself. While only two amphiphile spacer layers are required, it is appreciated that the same result can be accomplished by coating any even number of spacer amphiphile layers. The following is an illustration of how reversal can be achieved:

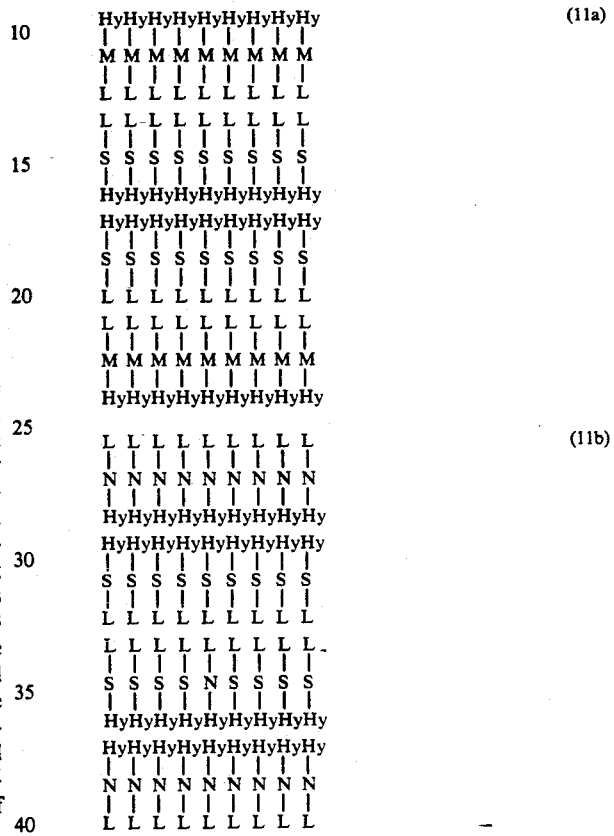

It should be noted that reversal with two repeated spacer amphiphile layers can be achieved independently of the layer sequence chosen below the lower L-M-Hy or L-N-Hy layer or above the next succeeding L-M-Hy or L N-Hy layer. Thus, use of an even number of spacer layers to reverse orientation can be applied starting with any one of X, Y or Z type L-B assemblies, if desired. Thus, this reversal scheme is compatible with all of the L-B layer sequences previously noted.

The amphiphiles used to form the L-B layer units can be made up of hydrophilic moieties (head groups) Hy, lipophilic moieties (tail groups) L and linking groups K, including both spacer groups S and molecular dipoles M, that take a variety of different forms.

The following are illustrative of amphiphiles with varied hydrophilic moieties serving as head groups:

 (H-1)

 (H-2)

 (H-3)

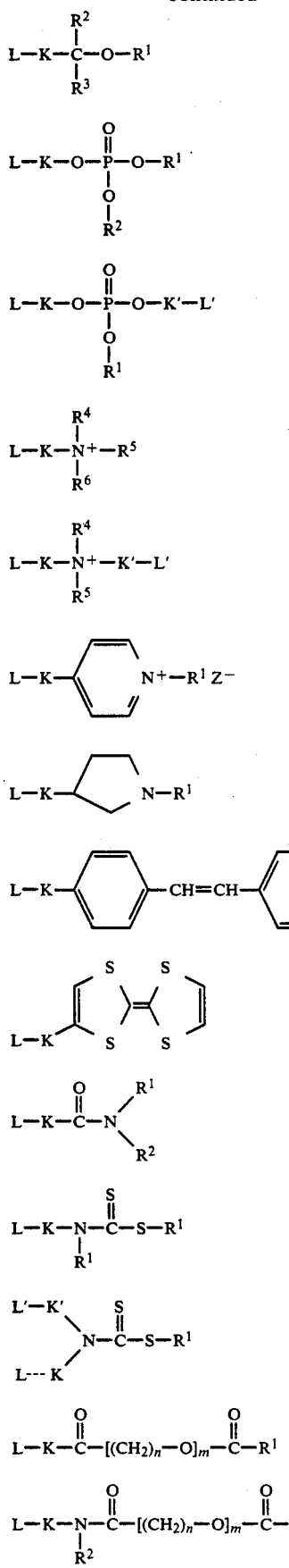

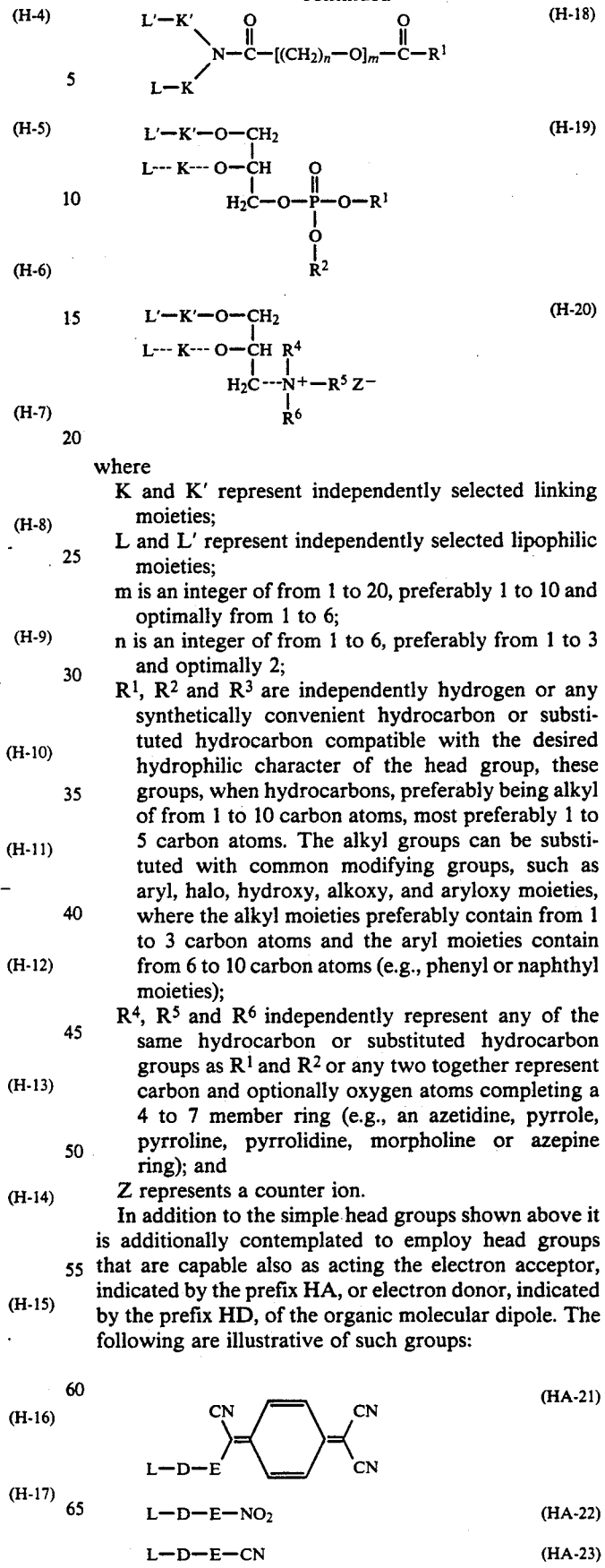

where
K and K' represent independently selected linking moieties;
L and L' represent independently selected lipophilic moieties;
m is an integer of from 1 to 20, preferably 1 to 10 and optimally from 1 to 6;
n is an integer of from 1 to 6, preferably from 1 to 3 and optimally 2;
$R^1$, $R^2$ and $R^3$ are independently hydrogen or any synthetically convenient hydrocarbon or substituted hydrocarbon compatible with the desired hydrophilic character of the head group, these groups, when hydrocarbons, preferably being alkyl of from 1 to 10 carbon atoms, most preferably 1 to 5 carbon atoms. The alkyl groups can be substituted with common modifying groups, such as aryl, halo, hydroxy, alkoxy, and aryloxy moieties, where the alkyl moieties preferably contain from 1 to 3 carbon atoms and the aryl moieties contain from 6 to 10 carbon atoms (e.g., phenyl or naphthyl moieties);
$R^4$, $R^5$ and $R^6$ independently represent any of the same hydrocarbon or substituted hydrocarbon groups as $R^1$ and $R^2$ or any two together represent carbon and optionally oxygen atoms completing a 4 to 7 member ring (e.g., an azetidine, pyrrole, pyrroline, pyrrolidine, morpholine or azepine ring); and
Z represents a counter ion.

In addition to the simple head groups shown above it is additionally contemplated to employ head groups that are capable also as acting the electron acceptor, indicated by the prefix HA, or electron donor, indicated by the prefix HD, of the organic molecular dipole. The following are illustrative of such groups:

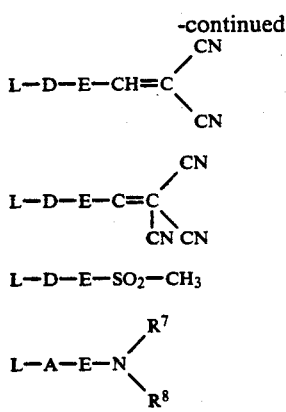

where
R[7] and R[8] are independently hydrogen, hydrocarbon or substituted hydrocarbon selected similarly as R[1] and R[2].

The lipophilic moieties or tail groups L are nonpolar groups. Depending upon the group to which the lipophilic moiety is attached, an alkyl group of from 1 to 3 carbon atoms (e.g., a methyl, ethyl or propyl group) can function effectively as a lipophilic moiety. In particular embodiments of the invention, preferred lipophilic moieties are hydrocarbons that contain a least four carbon atoms, including alkyl, cycloalkyl, alkenyl groups, cycloalkenyl, aryl, alkaryl, and aralkyl moieties. To avoid excessive bulk the hydrocarbon lipophilic moieties are preferably limited to 24 or fewer carbon atoms. In particular embodiments of the invention, alkyl and alkenyl groups of from about 4 to 20 carbon atoms are preferred. Aryl groups, such as phenyl, naphthyl and biphenyl, are specifically contemplated. In particular embodiments of the invention, preferred cycloalkyl groups are those that contain from 5 to 7 ring carbon atoms. Halogen substitution of the hydrocarbons is recognized to increase their lipophilic properties. Fluorosubstituted hydrocarbons are specifically recognized to be highly lipophilic.

Penner et al, cited above, has discovered quite unexpectedly that when the first and second amphiphiles are polymers and the repeating units of at least one of the amphiphile polymers contains a branched lipophilic moiety L of up to 9 carbon atoms the optical attenuation within the organic layer unit formed by the Y type L-B assembly is exceedingly low. Specifically, optical attenuation levels are reduced to less than 2 dB/cm. In particular embodiments of the invention, it is preferred that both of the lipophilic moieties be formed of a branched hydrocarbon of 9 or fewer carbon atoms, particularly when each of the polymeric amphiphiles forming the Y type L-B assembly contains an organic molecular dipole moiety. In a specifically preferred form the branched lipophilic moiety exhibits the structure:

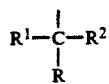

(12)

where
R is hydrogen or a hydrocarbon and
R[1] and R[2] represent separate hydrocarbons or together complete a cyclic hydrocarbon. The branched lipophilic moiety can be chosen from among 2-propyl, 2-butyl, 2-(2-methylpropyl), 2-(2-methylbutyl), 2-(2-ethylbutyl), 2-(3-methylbutyl), 2-pentyl, 2-(2-methylpentyl), 2-(3-methylpentyl), 3-pentyl, 3-(2,4-dimethylpentyl), 3-(3-ethylpentyl), 2-hexyl, 2-(2-methylhexyl), 2-(3-methylhexyl), 2-(4-methylhexyl), 2-(3-ethylhexyl), 2-(4-ethylhexyl), 2-heptyl, 4-heptyl, 4-(3-ethylheptyl), cyclopentyl, cyclohexyl, phenyl, tolyl, xylyl, ethylphenyl, norboranyl or similar cyclic and acylic branched hydrocarbons. As noted above, corresponding halohydrocarbon and halocarbon lipophilic moieties are even more lipophilic.

When the linking groups K function merely to provide a synthetically convenient linkage between the hydrophilic moieties Hy and the lipophilic moieties L, as in the amphiphiles Hy-S-L, they can take a wide variety of forms. While the Hy and L moieties are relied upon primarily to provide ambiphilic properties, linking groups are seldom entirely neutral moieties. When the linking group is a divalent hydrocarbon moiety, the demarcation between the linking group and lipophilic moiety is, of course, arbitrary. In other instances the linking group can contain one or more polar moieties, making it hydrophilic to some degree; however, the linking group is normally chosen to be less hydrophilic than the hydrophilic moiety Hy with which it is employed. When the linking moiety contains a hydrophilic or lipophilic portion, that portion is preferably attached to the hydrophilic or lipophilic moiety, so that it supplements the hydrophilic or lipophilic moiety in providing the desired ambiphilic properties to the molecule.

The following are representative of linking groups:

$$—(CH_2)_n— \quad (K\text{-}1)$$

where n is an integer of from 1 to 24, preferably from 4 to 20;

$$—(CH_2)_n—Z— \quad (K\text{-}2)$$

where n satisfies the K-1 definition and Z is a divalent oxy, —O—, thio —S— or amino —N(R[1])— linkage with R[1] satisfying the definition above;

where Z[1] represents an oxo, =O, or thione, =S, atom;

$$—(CH_2)_l—(CH=CH)_m—(CH_n)— \quad (K\text{-}4)$$

where l, m and n are each integers of from 4 to 20, with l+m+n preferably being no more than 20;

$$—(CH_2)_m—C≡C—C≡C—(CH_2)_n— \quad (K\text{-}5)$$

where n and n are each integers of from 4 to 20, with m+n preferably being from 10 to 20;

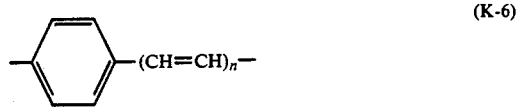

where n is an integer of from 1 to 10, preferably from 1 to 4;

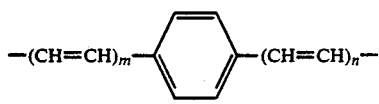
(K-7)

where m and n are each integers of from 1 to 10, preferably from 1 to 4;

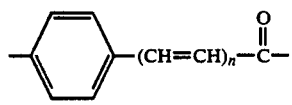
(K-8)

where n is an integer of from 1 to 10, preferably from 1 to 4;

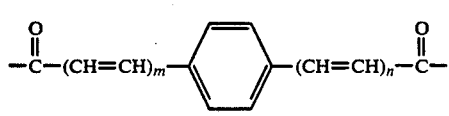
(K-9)

where m and n are each integers of from 1 to 10, preferably from 1 to 4;

(K-10)

where m is an integer of from 1 to 5, preferably 1 or 2;

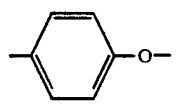
(K-11)

(K-12)

where m is an integer of from 1 to 5, preferably 1 or 2.

When the amphiphile contains an organic molecular dipole, -M-, the overall structure of the amphiphile can be represented as Hy-A-E-D-L or Hy-D-E-A-L. In the majority of instances the electron acceptor moiety is itself sufficiently hydrophilic to be employed as a head group. Thus, in particular embodiments of the invention, the preferred electron acceptor moieties for forming the Hy-A-E-D-L amphiphiles are those described above identified by the prefix HA. An amine structure, HD-26, is shown above capable of acting as both a donor and a head group; however, electron donor moieties are in general not strongly hydrophilic moieties. When employed to form an Hy-D-E-A-L amphiphile, the electron donor moiety D is preferably employed in particular embodiments of the invention with one of the hydrophilic groups identified above by the prefix H. In addition to amines, exemplary electron donor moieties contemplated include oxy, —O—, and thio, —S—, moieties directly linked to a carbon atom of E and a carbon atom of Hy or L. The amine structure of HD-26, above can be converted to a L-D- structure by replacing one or both of $R^1$ and $R^2$ with a more lipophilic group L of the type described above.

The electron acceptor —$SO_2$— particularly lends itself to forming Hy-D-E-A-L amphiphiles, since, unlike the other electron acceptors listed above, it lends itself to -A-L structures, such as

  (S-1)

where
$R^9$ is $T^1$ or $T^2$.

$T^1$ can be a multicarbon atom hydrocarbon or substituted hydrocarbon of the type described above for use as L groups, preferably those containing at least 5 carbon atoms and optimally at least 10 carbon atoms.

$T^2$ requires a difluoro-substituted carbon atom attached to the sulfonyl, —$SO_2$—, moiety—that is, the α carbon atom. When $R^9$ takes the form of $T^2$, the structure can be represented as follows:

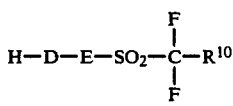  (S-2)

where
$R^{10}$ can be hydrogen, fluorine, or any hydrocarbon or substituted hydrocarbon described above as being useful as a lipophilic moiety, but preferably is a hydrocarbon containing less than 10 and optimally less than 5 carbon atoms.

When the α carbon atom is difluoro substituted, the second order polarizability β the molecule is enhanced. In addition the fluoro substituents markedly increase the hydrophobicity of the sulfonyl substituent. This allows the number of carbon atoms required to form the lipophilic moiety L to be reduced. For example, the moiety —$SO_2CH_3$ has been noted above to be a hydrophilic electron acceptor moiety—i.e., an HA moiety; but the moiety —$SO_2CF_3$ is a lipophilic acceptor moiety—i.e., an LA- moiety. Further the trifluormethylsulfonyl moiety is a much more efficient electron acceptor than the methylsulfonyl moiety. Additional fluoro substitutions of β and γ carbon atoms increase the lipophilic character of the moieties satisfying formula S-2, but make progressively smaller additional contributions to second order polarizability.

The linking group E between the electron donor D and electron acceptor A can take the form of a conjugated π bonding linkage of any convenient type. In the linking groups described above K-6, K-7 and K-10 provide the required conjugated π bonding linkage. The conjugated π bonding linkages of K-4, K-8, K-9 and K-12 are, of course, not useful in forming organic molecular dipoles, since the conjugation is interrupted by one or more nonconjugated linkages. This prevents resonance between an excited state and a ground state required for useful organic molecular dipoles.

In particular embodiments of the invention, the preferred conjugated π bonding linkages E between the electron donor D and electron acceptor A moieties the terminal portions of the linkage are aromatic. In choosing a linkage E for an organic molecular dipole a number of factors must be taken into account in addition to the conjugated π bonding linkage. Increasing the length of the linkage tends to increase the dipole moment and is therefore beneficial, but this must be balanced against reducing the resonance efficiency of the organic molecular dipole, which occurs as the conjugated π bonding linkage is lengthened. In practice a balance is struck which has the net effect of achieving the highest attainable second order polarizability.

Lengthening the conjugated π bonding linkage also has the property of increasing the wavelengths of electromagnetic radiation the molecular dipole will absorb. Thus, for a specific application, the length of the conjugated π bonding linkage is limited by λ/2 as well as specific choices of the electron donor and acceptor moieties. In particular embodiments of the invention, preferred linking groups produce molecular dipoles that are transparent to electromagnetic radiation in the near infrared and at least a portion of the visible spectra. Since the thickness of organic layer unit 107 is a function of λ, it is apparent that for organic layer units of minimum thickness (and hence minimum numbers of L B layers) preferred organic molecular dipoles are those that are transparent to light wavelengths extending into and, preferably, throughout the blue portion of the spectrum.

In particular embodiments of the invention, the following are preferred linking groups E:

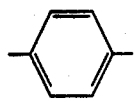  (E-1)

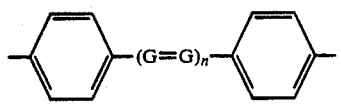  (E-2)

where G is independently in each occurrence methine or substituted methine, —CR$^{11}$—, or aza; R$^{11}$ is hydrogen or alkyl of from 1 to 3 carbon atoms; n is from 1 to 3 and optimally 1; with the further proviso that no more than two aza moieties are next adjacent.

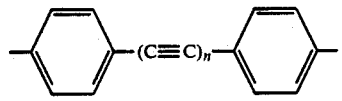  (E-3)

where n is as defined for E-2.

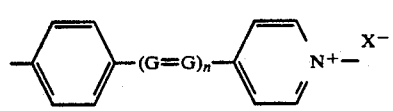  (E-4)

where G and n are as defined for E-2 and X$^-$ is a counter ion.

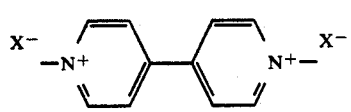  (E-5)

where X$^-$ is a counter ion.

In addition to the conjugated π bonding linkages E shown above that are generally useful with terminal L-A-, Hy-A-, L-D- and Hy-D- moieties of the type described above, other linking groups particularly useful with sulfonyl electron acceptor moieties of the type disclosed by Ulman et al U.S. Pat. No. 4,792,208, the disclosure of which is here incorporated by reference, are specifically contemplated. In the linking groups E-1 to E-5 no substituents to the various aromatic rings are shown. However, any of the R$^a$ and R$^d$ ring substituents of Ulman et al can be employed, if desired.

Stilbene and diazobenzene linking groups E as well as their pyridinium analogues have been observed to provide an optimum balance of synthetic convenience and optical advantages. The following are illustrations of organic molecular dipoles of employing these types of linking groups that have been observed to be particularly useful:

(MD-1)
    4-(N-Methyl N-octadecylamino)-4'-nitrostilbene (MD-2)
    4-(N,N-Dioctadecylamino)-4'-methylsulfonylstilbene (MD-3)
    4-{2-[4-(N,N-Dimethylamino)phenyl]ethenyl}-N-octadecylpyridinium chloride (MD-4)
    4-{2-[4-(N,N Dimethylamino)phenyl]ethenyl}-N-docosanylpyridinium sulfate (MD-5)
    6-{N-methyl-N-[4-(4'-octadecylsulfonyl)stilbene]amino}hexanoic acid (MD-6)
    4-(N-Methyl-N-(3,6-dioxyoctan-8-ol)amino-4'-octadecylsulfonylstilbene In particular embodiments of the invention, preferred L-B spacer units H-S-L are saturated and monounsaturated fatty acids containing from 16 to 24 carbon atoms, including hexadecanoic, octadecanoic, eicosanoic, docosanoic, 22-tricosenoic and tetradecanoic acids. Phosphates, such as [CH$_3$(CH)$_{12}$(CH=CH)$_2$C(O)O(CH$_6$)O]$_2$P(O)OH and [CH$_3$(CH)$_4$OC(O)CH=CH(p—C$_6$H$_4$)CH=CH)-C(O)O(CH$_6$)—O]$_2$P(O)OH, are specifically contemplated for use as spacer units.

The foregoing elaboration of amphiphiles has focused on monomeric structures. As noted above, it is also possible to employ polymeric amphiphiles. Polymeric amphiphiles offer advantages in layer stability. Polymers that are lipophilic in character can be transformed into amphiphiles by including one or more Hy-K- pendant groups, where the designation Hy-K- indicates the various forms of these groups described above. Similarly polymers that are hydrophilic in character can be transformed into amphiphiles by including one or more L-K- pendant groups, where the designation L-K- indicates the various forms of these groups described above.

The following are representative polymeric amphiphiles contemplated for use in forming L-B layer units:

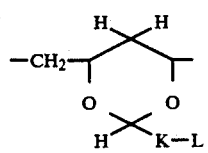  (P-1)

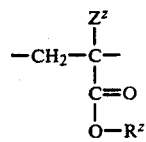  (P-2)

where $R^z$ represents —L or —K—L and $Z^z$ represents hydrogen, methyl, ethyl or cyano;

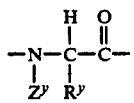 (P-3)

where $R^y$ represents —L or —K—L when $Z^y$ is hydrogen or alkyl of from 1 to 3 carbon atoms and $Z^y$ represents —L or —K—L when $R^y$ is hydrogen or alkyl of from 1 to 3 carbon atoms;

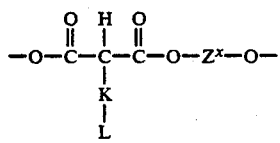 (P-4)

where $Z^x$ represents a divalent hydrocarbon containing from 1 to 12 carbon atoms (e.g., an alkanediyl, an alkenediyl, a cycloalkanediyl, phenylene, etc.);

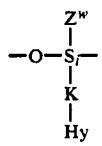 (P-5)

where $Z^w$ represents a hydrocarbon group of from 1 to 12 carbon atoms (e.g. alkyl or phenyl);

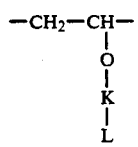 (P-6)

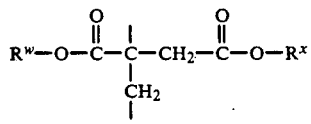 (P-7)

where one of $R^w$ and $R^x$ repents —K—L with the other being —K'—L' or any synthetically convenient lipophilic (—L) or hydrophilic (—Hy) moiety;

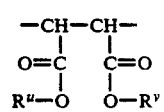 (P-8)

where one of $R^u$ and $R^v$ represents —K—L with the other being —K'—L' or any synthetically convenient lipophilic (—L) or hydrophilic (—Hy) moiety;

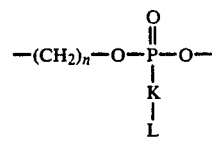 (P-9)

where n is an integer of from 2 to 4;

 (P-10)

where one of $R^s$ and $R^t$ represents —K—L with the other being —K'—L' or any synthetically convenient lipophilic (—L) or hydrophilic (—Hy) moiety;

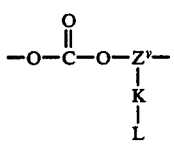 (P-11)

where $Z^v$ represents a trivalent hydrocarbon group of from 1 to 10 carbon atoms (e.g., —K—L substituted alkanediyl or phenylene);

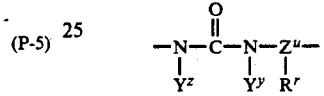 (P-12)

where at least one of $R^r$, $Y^y$ and $Y^z$ is —K—L and with any of $R^r$, $Y^y$ and $Y^z$ that are not —K—L being nay synthetically convenient atom or group (e.g. hydrogen or alkyl or aryl of from 1 to 10 carbon atoms) and $Z^u$ represents a trivalent hydrocarbon group of from 1 to 10 carbon atoms (e.g. a substituted alkanediyl or phenylene);

$$\begin{array}{c} -CH_2-CH- \\ | \\ \phantom{-CH_2-}\bigcirc \\ \phantom{-CH_2-}| \\ \phantom{-CH_2-}K-Hy \end{array}$$ (P-13)

$$\begin{array}{c} R^p \\ | \\ -Si- \\ | \\ R^q \end{array}$$ (P-14)

where at least one $R^p$ and $R^q$ is —K—L and the remaining of $R^p$ and $R^q$ is —K'—H' or any synthetic convenient lipophilic, —L, or hydrophilic, —Hy, moiety;

$$-O-Y^w-O-\overset{\overset{O}{\|}}{C}-\underset{\underset{L}{\underset{|}{K}}}{Z^t}-\overset{O}{\overset{\|}{C}}-$$ (P-15)

where $Y^w$ is a divalent hydrocarbon of from 1 to 12 carbon atoms (e.g. alkanediyl or phenylene) and $Z^t$ represents a trivalent hydrocarbon group of from 1 to 10 carbon atoms (e.g. a substituted alkanediyl or phenylene);

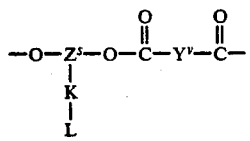 (P-16)

where $Y^v$ is a divalent hydrocarbon of from 1 to 12 carbon atoms (e.g. alkanediyl or phenylene) and $Z^s$ represents a trivalent hydrocarbon group of from 1 to 10 carbon atoms (e.g. a substituted alkanediyl or phenylene);

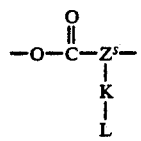 (P-17)

where $Z^s$ is as previously defined;

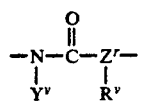 (P-18)

where $R^v$ represents —K—L when $Y^v$ is hydrogen or alkyl of from 1 to 3 carbon atoms and $Y^v$ represents —K—L when $R^v$ is hydrogen or alkyl of from 1 to 3 carbon atoms and $Z^r$ represents a trivalent hydrocarbon group of from 1 to 10 carbon atoms (e.g. a substituted alkanediyl or phenylene);

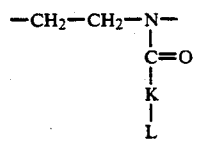 (P-19)

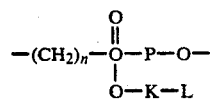 (P-20)

where n is the integer 2, 3 or 4;

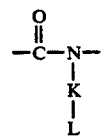 (P-21)

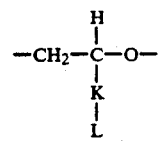 (P-22)

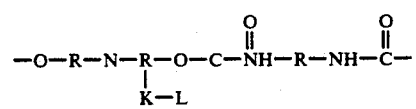 (P-23)

where R is —(CH$_2$)$_n$— or —(CH$_2$OCH$_2$)$_m$— and n and m are integers of from 1 to 6;

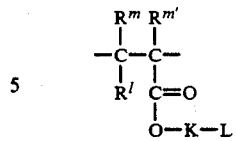 (P-24)

where $R^l$, $R^m$ and $R^{m'}$ can be independently hydrogen or any synthetically convenient hydrophilic, —Hy, or lipophilic, —L, moiety;

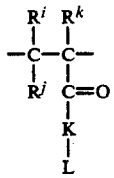 (P-25)

where $R^i$, $R^j$ and $R^k$ can be independently hydrogen or any synthetically convenient hydrophilic, —Hy, or lipophilic, —L, moiety;

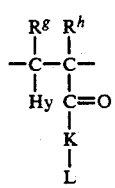 (P-26)

where $R^g$ and $R^h$ can be independently hydrogen or any synthetically convenient hydrophilic, —Hy, or lipophilic, —L, moiety;

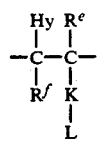 (P-27)

where $R^e$ and $R^f$ can be independently hydrogen or any synthetically convenient hydrophilic, —Hy, or lipophilic, —L, moiety;

 (P-28)

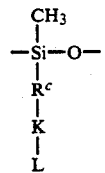

where $R^c$ is any synthetically convenient divalent hydrocarbon of from 1 to 12 carbon atoms (e.g., alkanediyl or phenylene).

The following are illustrative of polymers containing H—M—L repeating units linked through either the —H or —L moieties;

(PM-1)
  Poly{4'-N-methyl-N-[2-(2-acryloyloxyethoxy)ethoxy]ethylamino4-octadecylsulphonyl azobenzene)

(PM-2)
  Poly{4'-N-methyl-[2-(2-acryloyloxyethoxy)ethoxy]ethylamino-4-octadecylsulphonyl azobenzeneco-2-hydroxyethyl acrylate}[1:4-6 mole ratio]

(PM-3)
Poly{4'--
-dioctadecylamino-4-(6-acryloyloxy)hexylsulfonyl
azobenzene-co-2-hydroxyethyl acrylate}[1:4-6 mole ratio]

(PM-4)
Poly{4'-N-methyl-N-(8-acryloyloxy)octylamino-4-octadecylsulfonyl azobenzene-co-N,N-dimethyl acrylamide}[1:4-6 mole ratio]

(PM-5)
Poly{N [2-(hexamethyleneiminocarbonyloxy)ethyl]N-[2-(iminocarbonyloxy)ethyl]-N-[4-(4'-octadecylsulfonylazobenzene]amine}

(PM-6)
Poly{1-N methyl-N-[6-(acryloyloxy)hexylamino-4-perfluorodecylsulfonylphenyl-co-2-hydroxyethyl acrylate}{1 to 1.2 mole ration}

Polymer PM-6 is a preferred H—M—L polymer for the claimed invention, polymers PM-1 to PM-5 are not preferred. The following are illustrative of polymers containing H—S—L repeating units linked through either the —H or —L moieties:

(PS-1) Poly(t-butyl methacrylate)
(PS-2) Poly(i butyl methacrylate)
(PS-3) Poly[2-(methacryloyloxy)ethoxysuccinoyl-N,N-di-octadecylamide-co-2-hydroxyethyl acrylate][5-10:1 mole ratio]
(PS-4) Poly[oxy(dioctadecyl)malonyloxyethyloxyethyl]
(PS-5) Poly[oxyadipoyloxy(2,2-dioctadecyl)propylene]
(PS-6) Poly[oxycarbonyliminehexamethyleneiminocarbonyloxy(2,2-dioctadecylpropylene)]
(PS-7) Poly(γ-methyl-L-glutamate-co-γ-n-octadecylglutamate)

From a review of the various polymers listed above it is apparent that in most instances the hydrophilic and lipophilic moieties can be present before polymerization. It therefore follows that in most instances the monomers from which the polymers are formed are themselves amphiphiles. The degree of polymerization can vary widely, ranging from dimers through oligomers and lower molecular weight polymers with maximum molecular weights being limited only by the ability of the polymers to retain their fluid properties under L-B assembly construction conditions. It is generally preferred to employ polymers that have molecular weights of less than about 20,000. The polymers can be homopolymers or polymers that contain mixtures of repeating units with compatible Langmuir-Blodgett film-forming properties.

The major surface 105 of the support on which the organic layer unit is formed can take any convenient conventional form. The support portion 103 can be chosen so that the major surface is either hydrophilic or hydrophobic, thereby allowing the desired orientation of the first L-B layer unit 121 on the major surface. When the support is not itself initially transparent to $\lambda$ and $\lambda/2$ and of a lower refractive index than the first L-B layer unit, it is recognized that a conventional buffer layer can be employed to correct these deficiencies. Buffer layers of the type disclosed by Scozzafava et al U.S. Pat. No. 4,946,235; Rider et al U.S. Pat. No. 4,948,225; Dao et al U.S. Pat. No. 4,955,977 and Schildkraut et al U.S. Pat. No. 4,971,426, the disclosures of which are here incorporated by reference, are specifically contemplated.

Although optical article 100 has been shown with prisms 109 and 111 for coupling electromagnetic radiation $\lambda$ into and electromagnetic radiation $\lambda/2$ out of the optical article, it is appreciated that any convenient alternative conventional optical coupling structure can be substituted. For example, gratings can be substituted for the prisms shown. Most, but not all, infrared lasers are designed to emit electromagnetic radiation in its $TE_o$ mode. Thus, for most applications a polarizer, not shown, will receive electromagnetic radiation from the laser and convert it to the $TM_o$ mode before coupling into the optical article. If desired, a $TE_o$ to $TM_o$ polarizer can be viewed as a part of the optical article.

EXAMPLES

The invention can be better appreciated by reference to the following specific Examples. The Examples demonstrate the feasibility and advantages of constructions incorporating Y type L-B assemblies and the inferiority of X and Z type L-B assemblies.

In each of the Examples, preparations of Langmuir-Blodgett layer units were carried out using a commercial Langmuir two compartment trough mechanically equipped to transfer the substrate from one trough to the other, either while submerged in water contained in the reservoir or while held above the liquid reservoir. This permitted deposition on the substrate of different materials in each the two compartments in sequence permitting the film in each compartment to provide multiple layers on the substrate as the operation was repeated.

EXAMPLE 1

The purpose of this example is to demonstrate the capability of successful successive formation of Langmuir-Blodgett layer units 121 and 123. Specifically, this example demonstrates the formation of a Y type Langmuir-Blodgett assembly like that of 11a above, but with polymer amphiphiles. This example further demonstrates the successful deposition of the spacer amphiphile on itself to create the orientation inversion necessary to the formation of a second L-B layer unit. Finally, this example demonstrates the successful formation of an oppositely oriented second Y type Langmuir-Blodgett assembly on the first Y-type Langmuir-Blodgett assembly.

In one compartment a polymeric amphiphile PM-2 (hereinafter referred to as Film A) was dissolved in chloroform, spread on the surface of a pool of pure water and compressed. The amphiphile PM-2 can be schematically represented as Hy-D-E-A-L, where polymerization was through the Hy moiety.

In the other compartment polymeric amphiphile PS-1 (hereinafter also referred to as Film B) was dissolved in chloroform, spread on the surface of a pool of pure water and compressed. The polymeric amphiphile PS-1 can be schematically represented as Hy—S—L, where polymerization was through the Hy moiety.

Alternate deposition of PM-2 and PS-1 onto a silicon substrate made hydrophobic by reaction with octadecyl trichlorosilane by standard procedures was performed in a Film B before Film A (B/A) sequence fashion until several B/A bilayers were deposited. An even number (six) of B layers were deposited on top of the B/A bilayers. Alternate deposition was resumed depositing bilayers in an A/B fashion. A total of eighteen layers were deposited, with six of the eighteen being PM-2 layers.

Film thickness characterization was measured by ellipsometry (thickness variability) and second order nonlinear optical activity by Second Harmonic Generation (SHG) in reflection mode using a 1064 nm input wavelength and measuring output intensity at 532 nm using an optical system similar to that reported frequently in the literature. Sample thickness varied less than 5% across this film and was (291 Å) which is within 10% of expected thickness based on the ellipsometric measurement of films of A and B individually. Film characterization by SHG showed a low signal. The electronically amplified detector signal was +0.6 volts relative to the uncoated substrate. The low SHG measurement confirmed that the B/A bilayers and the A/B bilayers together formed a centrosymmetric unit. This in turn confirmed that the orientation inversion of the molecular dipoles required for a second L B layer unit had been successfully achieved.

EXAMPLE 2

A control

The purpose of this example is to provide further proof that the molecular dipole orientation inversion for the second L-B layer unit was achieved in Example 1 by comparing a structure clearly lacking such an inversion.

Example 1 was repeated, except that six B/A bilayers were deposited in sequence followed by the deposition of six B layers. This provided an organic layer unit having the same number of layers as in Example 1 and with each layer formed by the same amphiphiles, with the sole difference being the uniform orientation of the molecular dipoles in this example.

This control was measured ellipsometrically where thickness varied less than 5% across the film and was (302 Å) which is within 10% of expected values based on ellipsometric measurement of films A and B individually.

Second Order nonlinear optical activity was measured by Second Harmonic Generation (SHG) in reflection mode using 1064 nm input wavelength and measuring output intensity at 532 nm using an optical system similar to that reported frequently in the literature, which showed an increase in signal intensity, +3.25 volts relative to the uncoated substrate, which was greater than signal generated from Example 1 by a factor of 5.4.

EXAMPLE 3

A control

The purpose of this example is to illustrate the deposition advantage achieved in Example 1 by employing the spacer amphiphiles (PS-1).

The procedure of Example 1 was repeated, except that no spacer amphiphile PS-1 was employed. Instead, a first layer of PM-2 was deposited on the substrate, followed directly by second, third and subsequent layers of the same amphiphile, with layer thickness measurements being undertaken after each layer deposition.

Observations revealed that PM-2 failed to adhere to itself resulting in a failure to produce a multilayer structure. This failure can be expressed as the Film Transfer Ratio (FTR), which is a measurement of monolayer uptake by the substrate, where a complete layer should equal a ratio of 1.0. For the initial monolayer, the FTR was 1.01. For the second layer the FTR was only 0.08. Deposition of the third layer revealed an FTR of 0.749. Film thickness characterization was measured by ellipsometry. Sample thickness measured for the initial monolayer was (32 Å±1 Å). The thickness after the third layer deposition cycle varied randomly across the substrate between (41 Å and 83 Å). At no point on the film did the thickness reach the expected value of 96 Å) for a 3-layer film.

EXAMPLE 4

The purpose of this example is to demonstrate the feasibility of substituting an Hy-A-E-D-L amphiphile for an Hy-D-E-A-L amphiphile.

A procedure similar to that described in Example 1 was employed, except that the amphiphile PM-3 was substituted for PM-2. The amphiphile PM-3 can be schematically represented as Hy—A—E—D—L, where polymerization was through the Hy moiety. The significant difference in the amphiphile PM-3 as compared to PM-2 was the reversed orientation of the molecular dipole A—E—D in the polymer side chain.

Designating the PM-3 amphiphile layers as Film A and the PS-1 amphiphile layers as Film B, alternate deposition of these two materials onto a silicon substrate made hydrophobic by reaction with octadecyl trichlorosilane by standard procedures was performed in A/B fashion until an ABABA sequence of five layers had been deposited.

Film layer thickness measurements revealed that the layers were well formed, showing feasibility of employing PM-3 and PS-1 in combination to form an L-B layer unit.

EXAMPLE 5

A control

The purpose of this Example is to demonstrate the advantage of depositing the spacer amphiphile PS-1 on itself as compared to the amphiphile PM-3.

Onto the ABABA layer sequence of Example 4 an additional A layer was deposited to permit the subsequent deposition of B layers with inverted orientations. In other words, after depositing to two AB bilayers, two A layers were deposited, to permit subsequent deposition of BA bilayers.

The last A layer of the initial five layer sequence exhibited an FTR of 0.9. The A layer deposited directly on the last A layer (the sixth layer overall) exhibited an FTR of 0.98. However, the next deposited B layer (the seventh layer overall) exhibited and FTR of −0.5, indicating removal of a portion of the preceding A layer. The next A layer (the eighth layer overall) exhibited an FTR of 1.0, with the next B layer (the ninth layer overall) again exhibiting an FTR of −0.5.

The thickness measured by ellipsometry for this film after 10 deposition strokes was (131 Å). Based on thickness measurements of the individual materials the thickness of such a film should be (232 Å). In fact the thickness is only (15 Å), greater than calculated for layers 1 through 5 showing that the second half of the film structure did not form.

EXAMPLE 6

The purpose of this Example is to demonstrate the preparation of a thicker L-B layer unit.

The procedure of Example 1 employed to produce 93 B/A bilayers in which PM-2 was employed to form the A layers and PS-2 was employed to form the B layers.

Film thickness characterization was measured by ellipsometry (thickness variability) and second order nonlinear optical activity was measured by SHG in a reflection mode using a 1064 nm input wavelength and measuring output intensity at 532 nm using a conventional optical system. Sample thickness varied less than 5% across this film and was (3992 Å), which is within 5% of expected thickness based on the ellipsometric measurement of films of A and B individually. Film characterization by SHG showed a higher signal relative to thinner films. This corroborated a greater thickness.

EXAMPLE 7

The purpose of this example is to demonstrate the preparation of a thicker L-B layer unit.

The procedure of Example 6 was repeated to produce an L B layer unit containing 131 B/A bilayers, with PM-1 being employed to form the A layers and PS-2 being employed to form the B layers.

This film was visually clear and was tested for its ability to guide light. Polarized light from a Helium-Neon laser at 633 nm was coupled into the film through a prism by mechanical contact with the glass substrate. This film was able to guide light, with a propagation streak the entire length of the sample (over 3 cm). Attenuation of the Light beam was measured to be approximately 1 dB/cm of film length.

EXAMPLE 8

This example has as its purpose to demonstrate the preparation of a thicker L-B layer unit with variances in substrate and amphiphiles.

The procedure of Example 7 was repeated to produce an L-B layer unit containing 124 B/A bilayers, with PM-2 being employed to form the A layers and PS-1 being employed to form the B layers. The substrate was soda-lime glass coated with a 1500 to 2000 Å layer of indium tin oxide (ITO). The layer sequence was completed by six B layers, demonstrating the self-adherency of PS-1.

EXAMPLE 9

This example has as its purpose to demonstrate the efficiency of a monomeric spacer amphiphile. This example also further illustrates the capability of controlling L-B layer unit thicknesses and to obtain thicknesses that correlate well with those expected from individual layer thicknesses.

Preparation of an L-B layer unit was carried out using arachidic acid (i.e., eicosanoic acid) and methyl arachidate together as H—S—L monomeric spacer amphiphiles to form A films. Arachidic acid and methyl arachidate were dissolved in chloroform in a 9:1 molar ratio, spread on water and compressed into a monolayer film. The water was pure with a 0.003M concentration of cadmium ion added, which converted arachidic acid to cadmium arachidate. Three layers of the A film were deposited onto a hydrophilic silicon substrate for a length of 52 mm. A fourth layer of the A film was deposited for a length of 42 mm. The film layer at the air/water interface was removed by aspiration after film deposition. PM-1 was dissolved in chloroform, spread on the same water solution and compressed into a monolayer B film. The B film was deposited onto the existing A film layers, creating an A/B bilayer with the fourth cadmium arachidate and methyl arachidate layer. After deposition, the B film layer was also removed from the air/water interface. Arachidic acid and methyl arachidate in chloroform were again spread and compressed into a monolayer A film and deposited onto the existing film structure, this time for a length of 32 mm. PM-1 in chloroform was spread, compressed into a monolayer B film and deposited onto the existing film layer structure, creating two A/B bilayers. A third A/B Bilayer was deposited in the same manner as the second A/B bilayer. A bilayer of cadmium arachidate was deposited on top of the film for a length of 18 mm creating a step film structure with the following relative (not-to-scale) architecture:

```
AAAAAAA
AAAAAAA
BBBBBBBBBBB
AAAAAAAAAAA
BBBBBBBBBBB
AAAAAAAAAAA
BBBBBBBBBBBBBBB
AAAAAAAAAAAAAAA
AAAAAAAAAAAAAAAAAAAA
AAAAAAAAAAAAAAAAAAAA
AAAAAAAAAAAAAAAAAAAAAAA
```
Substrate Film thickness characterization was measured by ellipsometry (thickness variability). Sample thickness varied less than 5% across each film step (89Å, 146Å, 272Å, and 328Å) and was within 5% of overall expected thickness (326Å) based on the ellipsometric measurement of monolayers of A and B individually.

EXAMPLE 10

The purpose of this example is to demonstrate the capability of forming a Y type Langmuir-Blodgett assembly like that of 9a above, but with polymer amphiphiles. By being able to employ molecular dipole containing amphiphiles in next adjacent layers of the L-B layer the potential exists for a four-fold increase in conversion efficiency (see equation 3) as compared to employing a spacer amphiphile in alternate monomolecular layers.

PM-3 was dissolved in chloroform, spread on pure water and compressed into a monolayer A film. The A film was deposited onto a silicon substrate, which was made hydrophobic by reaction with octadecyl trichlorosilane by standard procedures. The film was deposited as a monolayer for a length of 60 mm. The A film layer at the air/water interface was removed by aspiration after film deposition. PM-1 was dissolved in chloroform, spread on pure water and compressed into a monolayer B film. The B film was deposited onto the existing A film layer, creating an A/B bilayer. After deposition, this film layer was also removed from the air/water interface. PM-3 in chloroform was again spread and compressed into a monolayer A film and deposited onto the existing A/B bilayer for a length of 42 mm. PM-1 in chloroform was spread, compressed into a monolayer film and deposited onto the existing film layer structure, creating two A/B bilayers. A third A/B bilayer was deposited in the same manner as bilayers 1 and 2, only for a length of 33 mm. A fourth A/B bilayer was deposited, similar to bilayers 1, 2, and 3, for a length of 23 mm, creating a step film architecture.

Film thickness characterization was measured by ellipsometry (thickness variability) and second order nonlinear optical activity by SHG in a reflection mode using a 1064 nm input wavelength and measuring output intensity at 532 nm using a conventional optical system. Sample thickness varied less than 5% across each bilayer (67Å, 152Å, 223Å, and 290Å respectively) and was within 10% of overall expected thickness (272Å) based on the ellipsometric measurement of monolayers of A and B individually. Film characterization by SHG showed incremental signal enhancement relative to the bilayer increments, as well as film uniformity for each bilayer.

EXAMPLE 11

The purpose of this example is to demonstrate the preparation of a Langmuir-Blodgett assembly consisting of layer units 121 and 123 as in Example 1, but substituting for the polymeric amphiphile PM-2, the polymeric amphiphile PM-6 containing a chromophore with a high second order polarizability which is transparent to electromagnetic radiation in the blue region of the spectrum, that is between 400 and 500 nanometers.

Alternate deposition was performed in the manner described in Example 1, substituting PM-6 for PM-2 as film A and substituting PS-2 for PS-1 as film B. A substrate consisting of a silicon wafer with a 3 micron surface layer of thermally grown oxide was made hydrophobic by reaction with octadecyl trichlorosilane.

A total of 300 layers were deposited in a film B before A fashion (B/A). An even number (four) layers of B were deposited on top of the B/A layers. Alternate deposition was resumed in an A/B fashion. A total of 468 A/B layers were deposited. Ellipsometry measured a total film thickness of 0.97 micron.

EXAMPLE 12

The purpose of this example is to demonstrate the preparation of a thicker Langmuir-Blodgett assembly which is transparent to electromagnetic radiation in the blue region of the spectrum, that is between 400 and 500 nanometers.

Alternate deposition of PM-6 and PS-2 was performed in the manner described in Example 11, with the exception that the substrate was Pyrex TM glass made hydrophobic by reaction with octadecyl trichlorosilane in the manner described in Example 1.

A total of 336 layers were deposited in a film B before A fashion (B/A). Ellipsometry measured a total film thickness of 0.93 microns.

The film was visually transparent (clear) and was tested for ability to guide light in the same manner as in Example 7 except that the light used was from an argon-ion laser at 457.9 nanometers polarized to propagate in the transverse magnetic mode. Optical attenuation of approximately 1.4 decibels per centimeter of film length was observed, indicating a very low level of optical attenuation in the film as compared to previously reported optical attenuation in high second order polarization susceptibility films, especially in the blue region of the spectrum.

The invention has been described in detail with particular reference to preferred embodiments thereof, but it will be understood that variations and modifications can be effected within the spirit and scope of the invention.

What is claimed is:

1. An optical article comprised of
an organic layer unit capable of converting a portion of electromagnetic radiation of a selected wavelength to its second harmonic wavelength,
means for optically coupling into said organic layer unit a source of polarized electromagnetic radiation having a wavelength representing a zero order transverse magnetic mode,
means for receiving from said organic layer unit a portion of the electromagnetic radiation in the form of a first order transverse magnetic mode, and
means for supporting said organic layer unit, said means for supporting having a portion adjoining said organic layer unit which exhibits a transmission attenuation of less than 2 dB/cm for electromagnetic radiation having a wavelength between 400 and 500 nanometers,
said organic layer unit having a thickness which is at least 70 percent of the wavelength of the zero order transverse magnetic mode and differs by less than 100 Å from the thickness required for identical propagation constants of the zero and first order transverse magnetic modes,
said organic layer unit being comprised of a Y type Langmuir-Blodgett assembly of amphiphiles forming a first Langmuir-Blodgett layer unit containing noncentrosymmetric organic molecular dipoles of a first orientation providing a second order polarization susceptibility to the second layer unit in excess of $10^{-9}$ electrostatic units,
said organic layer unit being comprised of a Y type Langmuir-Blodgett assembly of amphiphiles forming a second Langmuir-Blodgett layer unit adapted to be coated on the first Langmuir-Blodgett layer unit containing noncentrosymmetric organic molecular dipoles of a second orientation providing a second order polarization susceptibility to the second layer unit in excess of $10^{-9}$ electrostatic units, but of opposite sign to that of the first layer unit, and
said organic layer unit exhibiting a transmission attenuation of less than 2 dB/cm for electromagnetic radiation having a wavelength between 400 and 500 nanometers.

2. An optical article according to claim 1 in which the organic molecular dipoles in the Langmuir-Blodgett layer units are comprised of amphiphiles satisfying the formula:

Hy—M—L where
Hy is a hydrophilic moiety;
L is a lipophilic moiety; and
M is an organic molecular dipole linking group comprised of:

—A—E—D— where
A is an electron acceptor;
D is an electron donor; and
E is a conjugated $\pi$ bonding system linking A and D.

3. An optical article according to claim 2 in which at least one of the Langmuir-Blodgett layer units contains in a first series of layers amphiphiles that satisfy the formula:

Hy—A—E—D—L and in a second series of layers amphiphiles that satisfy the formula:

Hy—D—E—A—L.

4. An optical article according to claim 2 in which at least one of said Langmuir-Blodgett layer units additionally contains spacer amphiphiles that satisfy the formula:

Hy—S—L where
Hy is a hydrophilic moiety;
L is a lipophilic moiety; and
S is a linking moiety chosen to exhibit a second order polarizability of less than $10^{-30}$ electrostatic units.

5. An optical article according to claim 4 in which at least one of the Langmuir-Blodgett layer units contains in a first series of layers amphiphiles containing organic molecular dipole linkages that satisfy the formula:

Hy—M—L and in a second series of layers spacer amphiphiles that satisfy the formula:

Hy—S—L.

6. An optical article according to claim 5 in which said first and second Langmuir-Blodgett layer units are each comprised of the same amphiphiles.

7. An optical article according to claim 5 in which the Hy—M—L amphiphiles lack sufficient self-adherency to form a Y type Langmuir-Blodgett assembly in the absence of spacer amphiphiles.

8. An optical article according to claim 5 in which the second Langmuir-Blodgett layer unit contains at its interface with the first Langmuir-Blodgett layer unit an even number of self-adherent spacer amphiphile layers prior to its first Hy—M—L amphiphile layer.

9. An optical article according to claim 4 in which the spacer amphiphiles are repeating units of a polymer and are linked through their hydrophilic moieties.

10. An optical article according to claim 4 in which the spacer amphiphiles are repeating units of a polymer and are linked through their lipophilic moieties.

11. An optical article according to claim 4 in which the spacer amphiphiles are fatty acids containing from 16 to 24 carbon atoms.

12. An optical article according to claim 1 in which at least one of said Langmuir-Blodgett layer units is comprised of amphiphiles that are repeating units of a polymer.

13. An optical article according to claim 12 in which the amphiphiles are repeating units of a polymer and are linked through their hydrophilic moieties.

14. An optical article according to claim 1 in which at least one of said Langmuir-Blodgett layer units is comprised of amphiphiles that are repeating units of poly{1-N-methyl-N-(6-{acryloyloxy}hexylamino-4-perfluorodecylsulfonylphenyl-co-2-hydroxyethyl acrylate)}.

* * * * *